United States Patent [19]
Wolfe, Jr. et al.

[11] Patent Number: 6,091,176
[45] Date of Patent: Jul. 18, 2000

[54] MOTOR SHAFT ASSEMBLY

[75] Inventors: Melvin Eugene Wolfe, Jr., Hallstead; Mark Earnest Baer, Williamsport, both of Pa.; James Frank Streeter, Oxford, N.Y.

[73] Assignee: Shop Vac Corporation, Williamsport, Pa.

[21] Appl. No.: 09/294,706

[22] Filed: Apr. 19, 1999

Related U.S. Application Data

[62] Division of application No. 08/936,279, Sep. 24, 1997, Pat. No. 5,943,776.

[51] Int. Cl.$^7$ .............................. H02K 5/16; H02K 7/08; H02K 9/06; F16C 43/04
[52] U.S. Cl. ............................ 310/90; 310/62; 384/537; 384/585
[58] Field of Search .................. 310/62, 63, 90, 310/261; 384/537, 585

[56] References Cited

U.S. PATENT DOCUMENTS

| | | | |
|---|---|---|---|
| 320,392 | 6/1885 | Peterson et al. ............................ 301/1 |
| 1,023,272 | 4/1912 | Oakes ........................................ 416/174 |
| 1,553,681 | 9/1925 | Freitag .................... 415/124.2 |
| 1,879,081 | 9/1932 | Carpentier ................................. 440/52 |
| 1,886,395 | 11/1932 | Graul .................................. 384/472 |
| 1,895,874 | 1/1933 | Barbarou ................................. 416/174 |
| 2,001,492 | 5/1935 | Herrlinger ............................. 29/156.8 |
| 2,174,010 | 9/1939 | Patterson ................................... 64/11 |
| 2,195,749 | 4/1940 | Lignian .................. 29/149.5 |
| 2,248,405 | 7/1941 | Freeman ...................... 286/5 |
| 2,469,116 | 5/1949 | Kiekhaefer .............................. 170/177 |
| 2,522,991 | 9/1950 | Caserta ...................................... 287/53 |
| 2,653,459 | 9/1953 | Morrill ....................................... 64/27 |
| 2,696,188 | 12/1954 | Armstrong et al. ...................... 115/18 |
| 2,824,434 | 2/1958 | Stern ........................................... 64/11 |
| 2,851,245 | 9/1958 | Beale ........................................ 253/40 |
| 2,926,542 | 3/1960 | Schmitter et al. ........................ 74/421 |
| 2,958,758 | 11/1960 | Snell ....................................... 219/152 |
| 3,037,458 | 6/1962 | Olmstead et al. ....................... 103/114 |
| 3,102,490 | 9/1963 | Shiley ........................................ 103/87 |
| 3,213,642 | 10/1965 | Stern et al. ................................. 64/11 |
| 3,285,187 | 11/1966 | Anderson, Jr. ........................... 103/115 |
| 3,423,957 | 1/1969 | Palmer ......................................... 64/6 |
| 3,590,461 | 7/1971 | Siler ......................................... 29/240 |
| 3,632,220 | 1/1972 | Lansinger et al. ....................... 415/112 |
| 3,754,837 | 8/1973 | Shimanckas ............................. 416/93 |
| 3,829,957 | 8/1974 | Pouch et al. ............................. 29/445 |
| 3,871,324 | 3/1975 | Snyder .................................... 115/17 |
| 3,905,208 | 9/1975 | Oyama et al. ............................. 64/11 |
| 4,065,219 | 12/1977 | Levine .................... 403/287 |
| 4,236,767 | 12/1980 | Feldle ................... 308/187.1 |
| 4,289,445 | 9/1981 | Sims ....................................... 415/113 |
| 4,423,540 | 1/1984 | Hishida ................................... 29/460 |
| 4,462,148 | 7/1984 | Joyce ..................................... 29/447 |
| 4,498,874 | 2/1985 | Pichl ....................................... 440/83 |
| 4,574,448 | 3/1986 | Brandenstein et al. ............... 29/283.5 |
| 4,655,684 | 4/1987 | Haentjens ............................. 415/170 |
| 4,676,714 | 6/1987 | Fukazawa et al. ....................... 415/72 |
| 4,752,993 | 6/1988 | Oaks ....................................... 29/21.1 |
| 4,852,230 | 8/1989 | Yu ......................................... 29/148.4 |
| 4,863,406 | 9/1989 | Bland et al. .............................. 440/83 |
| 4,883,408 | 11/1989 | Borcherding ............................. 416/93 |
| 4,911,610 | 3/1990 | Olschewski et al. ................ 415/170.1 |
| 4,955,786 | 9/1990 | Kunkel et al. .......................... 415/110 |
| 5,133,123 | 7/1992 | Rigg ..................................... 29/897.31 |
| 5,199,152 | 4/1993 | Wagner ................................... 29/444 |
| 5,207,561 | 5/1993 | Godichon ............................... 416/134 |
| 5,244,348 | 9/1993 | Karls et al. ............................. 416/204 |
| 5,272,930 | 12/1993 | Nakamura et al. ...................... 74/434 |
| 5,330,284 | 7/1994 | Persson .................................. 403/370 |
| 5,370,587 | 12/1994 | Johnson et al. ........................ 474/166 |
| 5,489,187 | 2/1996 | Ray ........................................ 415/111 |
| 5,566,464 | 10/1996 | Davis ........................................ 33/712 |
| 5,593,280 | 1/1997 | Takada et al. ............................ 416/44 |

*Primary Examiner*—Clayton LaBalle
*Attorney, Agent, or Firm*—Marshall, O'Tool, Gerstein, Murray & Borun

[57] ABSTRACT

A motor shaft assembly method for easily and inexpensively assembling a motor shaft with components and a motor housing eliminates the need for a snap ring or a threaded nut to retain the components on the shaft.

8 Claims, 2 Drawing Sheets

MOTOR SHAFT ASSEMBLY

This is a Divisional of U.S. application Ser. No. 08/936,279, filed Sep. 24, 1997 now U.S. Pat. No. 5,943,776.

TECHNICAL FIELD

The present invention relates generally to motors and more particularly to a motor shift assembly.

BACKGROUND ART

In motor assembly situations, it is typically necessary to assemble a motor shaft with a motor housing. Additionally, it is often necessary to affix a component to the motor shaft after the motor shaft and the motor housing are assembled.

One method of assembling a motor shaft in a motor housing includes installing a snap ring into a groove in the motor shaft. The snap ring serves as a retainer for a bearing which is pressed onto the motor shaft and rests against the snap ring. The motor shaft and its associated components are installed into the motor housing with one end of the shaft protruding from the housing. A barrel spacer is then fitted onto the shaft next to the bearing. After placement on the shaft, the barrel spacer also protrudes from the motor housing. A first washer is slid onto the protruding end of the shaft and abuts the barrel spacer. In certain applications a component, such as an impeller, may also be slid onto the protruding end of the shaft into abutment with the first washer. A second washer is placed onto the motor shaft to sandwich the component between two washers. A hex nut is then threaded onto the end of the protruding shaft in order to hold all components on the shaft together in an axial direction against the snap ring. The threaded nut serves to apply pressure to the washers, which in turn hold the impeller to insure that the impeller rotates as the motor shaft rotates.

The previously described method has disadvantages. First, the snap ring and groove method of retaining the bearing is not an optimal solution in terms of quality. Secondly, it is not easy to tighten the nut onto the motor shaft, because the shaft has a tendency to rotate as the nut is tightened.

SUMMARY OF THE INVENTION

In accordance with the present invention, a motor assembly having parts on the motor shaft that are retained without the use of a hex nut is disclosed.

More particularly, in accordance with one aspect of the present invention, a motor assembly includes a motor shaft, a first upset portion located at a first axial position on the motor shaft, a second upset portion located at a second axial position on the motor shaft, wherein the first axial position and the second axial position are a distance apart, and a bearing having a width less than the distance between the first axial position and the second axial position and disposed between the first upset portion and the second upset portion. The motor assembly further includes a drive spacer installed on the motor shaft in abutment with the bearing and keyed to accommodate the second upset portion of the motor shaft to prevent the drive spacer from rotating with respect to the motor shaft, a motor component installed on the motor shaft in abutment with the drive spacer, and a retainer clip installed on the motor shaft in abutment with the motor component, wherein the retainer clip holds the motor component and the drive spacer axially on the shaft.

Other features and advantages of the present invention with become apparent from the attached specification and drawings.

DESCRIPTION OF THE PREFERRED EMBODIMENTS

Figure 1:
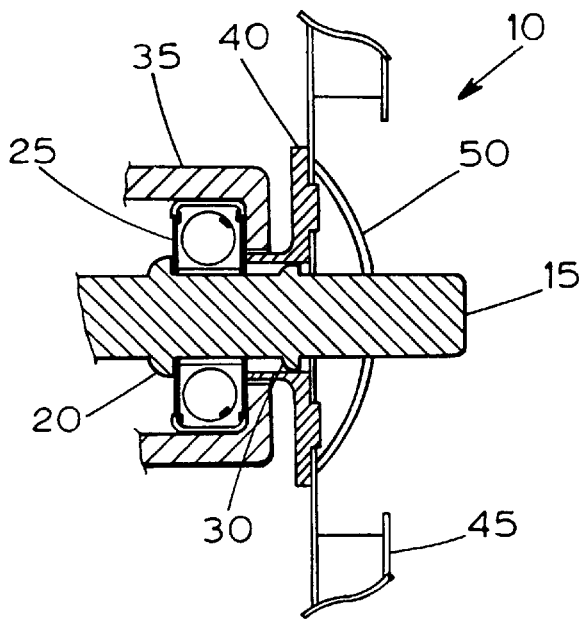
FIG. 1 comprises a fragmentary cross-sectional view of a fully assembled motor assembly.

Referring now to FIG. 1, a motor assembly 10 constructed using the method of the present invention is shown. The motor assembly 10 is comprised of a motor shaft 15, a first upset portion 20, a bearing assembly 25, a second upset portion 30, a motor housing 35, a drive spacer 40, an impeller 45, and a retaining clip 50. Note that the impeller 45 may be replaced by any other suitable shaft component.

Figure 3:
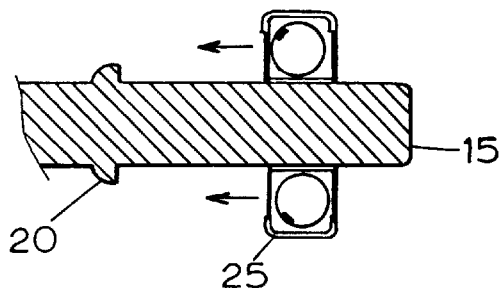
FIG. 3 comprises a fragmentary cross-sectional view illustrating the pressing of the bearing assembly onto the shaft.
Figure 4:
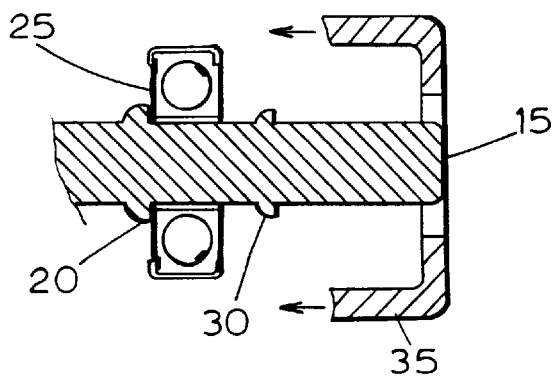
FIG. 4 comprises a fragmentary view showing the assembly of the shaft and bearing components into the motor housing.
Figure 2:
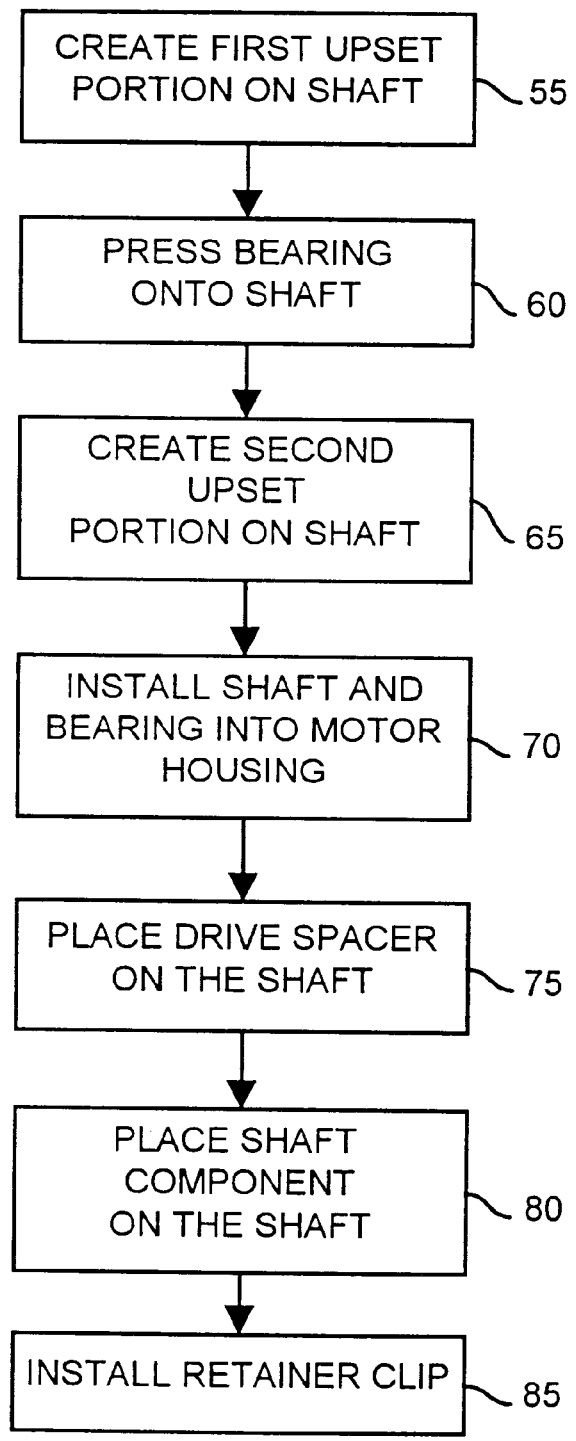
FIG. 2 is a diagram representing the method steps of the present invention.

FIG. 2 is a diagram illustrating the method of the present invention. Note that FIGS. 3 and 4 are used in conjunction with FIG. 2 to illustrate the method of assembly set forth by the present invention. Returning to FIG. 2, at a first step 55 an upset portion 20 is created on the shaft 15. After the first upset portion 20 is made on the shaft 15, a bearing assembly 25 is pressed onto the shaft 15 as shown in FIG. 3 (step 60). At a step 65 a second upset portion 30 is created on the opposite side of the bearing assembly 25 from the first upset portion 20. The shaft 15 complete with first and second upset portions 20, 30 and the bearing assembly 25 is then inserted at a step 70 into the motor housing 35 as shown in FIG. 4. Thereafter, at a step 75, a drive spacer 40 is placed onto the shaft 15. The drive spacer 40 is keyed to fit over the second upset portion 30, and extends into the motor housing 35 abutting the inner race of the bearing assembly 25. A shaft component 45 is then placed on the shaft 15 (step 80). In this particular case, the shaft component 45 is represented as a fan impeller 45. After the installation of the drive spacer 40 and the shaft component 45, a retainer clip 50 is installed (step 85) onto the end of the shaft 15. The retainer clip 50 performs the function of holding the keyed spacer 40 and the impeller 45 in place.

The first upset portions 20 on the shaft 15 may be made by inserting the shaft 15 into a press having opposed sets of teeth which are brought together with sufficient force to deform the shaft material outwardly at diametrically opposed locations of the shaft 15. After the bearing assembly 25 is pressed onto the shaft 15, the second upset portions 30 may be created by inserting the shaft 15, including the bearing assembly, into the press and operating the press to deform the shaft material in a manner similar or identical to the way in which the first upset portion 20 was made. First and second upset portions 20, 30 may be in radial alignment with one another or, alternatively, may have a random alignment with respect to one another.

In an alternative embodiment, first and second upset portions 20, 30 may be created simultaneously, through the use of a press before the bearing assembly 25 is pressed onto the shaft 15. This situation necessitates that the bearing assembly 25 be keyed so as to fit over the second upset portion 30 and yet not fit over the first upset portion 20.

In another embodiment, the bearing assembly 25 may be pressed onto the shaft 15 prior to the creation of the first and second upset portions 20, 30. In this embodiment, care must be taken to ensure that the bearing assembly 25 is properly located on the shaft 15 between where the upset portions 20, 30 will be, before the upset portions 20, 30 are made.

In yet another embodiment, the bearing assembly 25 may be installed in the motor housing 35 prior to assembly of the shaft 15 and the motor housing 35. In this situation, the motor shaft 15 is pressed into the motor housing 35, which includes the bearing assembly 25, after the first upset portion 20 on the shaft 15 is made. Subsequently, the second upset portion 30 is made after the shaft 15 is mated with the motor housing 35.

The use of the retaining clip 50 eliminates the need for the tightening of a nut onto the end of the shaft 15. The retaining clip 50 is merely pressed onto the shaft 15 in order to hold the impeller 45 in place.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A motor assembly, comprising:

a motor shaft;

a first upset portion located at a first axial position on the motor shaft;

a second upset portion located at a second axial position on the motor shaft, wherein the first axial position and the second axial position are a distance apart;

a bearing having a width less than the distance between the first axial position and the second axial position and disposed between the first upset portion and the second upset portion;

a drive spacer installed on the motor shaft in abutment with the bearing and keyed to accommodate the second upset portion of the motor shaft to prevent the drive spacer from rotating with respect to the motor shaft;

a motor component installed on the motor shaft in abutment with the drive spacer; and a retainer clip installed on the motor shaft in abutment with the motor component, wherein the retainer clip holds the motor component and the drive spacer axially on the shaft.

2. The motor assembly of claim 1, wherein the motor component comprises an impeller.

3. The motor assembly of claim 1, wherein the motor shaft comprises no threads.

4. The motor assembly of claim 1, wherein the retainer clip comprises a spring clip.

5. The motor assembly of claim 1, wherein the first and second upset portions are formed from the motor shaft.

6. The motor assembly of claim 1, wherein the bearing is keyed to fit over the second upset portion.

7. The motor assembly of claim 1, wherein the bearing is not keyed.

8. The motor assembly of claim 1, wherein the first and second upset portions are radially aligned with one another.

* * * * *